(12) United States Patent
Fernandes

(10) Patent No.: US 8,273,430 B2
(45) Date of Patent: Sep. 25, 2012

(54) METAL/POLYMER LAMINATE DUCTING AND METHOD FOR MAKING SAME

(75) Inventor: Leslie Fernandes, La Cañada, CA (US)

(73) Assignee: Senior Investments GmbH, Schaffhausen (CH)

( * ) Notice: Subject to any disclaimer, the term of this patent is extended or adjusted under 35 U.S.C. 154(b) by 0 days.

(21) Appl. No.: 11/700,797

(22) Filed: Jan. 31, 2007

(65) Prior Publication Data

US 2008/0178995 A1   Jul. 31, 2008

(51) Int. Cl.
*B32B 1/08* (2006.01)
*B32B 23/00* (2006.01)

(52) U.S. Cl. .............. 428/36.1; 428/34.1; 428/34.2; 428/35.7; 428/35.9; 428/36.9; 428/36.91

(58) Field of Classification Search .............. 428/34.1, 428/34.2, 35.7, 36.9, 36.91, 36.1, 35.9
See application file for complete search history.

(56) References Cited

U.S. PATENT DOCUMENTS

| | | | |
|---|---|---|---|
| 2,226,523 A | 12/1940 | Peck | |
| 2,525,644 A | 10/1950 | Brunson | |
| 2,861,598 A | 11/1958 | Carder, Jr. et al. | |
| 3,434,502 A | 3/1969 | Snelling | |
| 3,911,961 A | 10/1975 | Peyton et al. | |
| 4,020,875 A | 5/1977 | Akiba | |
| 4,071,048 A | 1/1978 | Watase | |
| 4,316,072 A | 2/1982 | Arnoldt | |
| 4,428,789 A | 1/1984 | Masaaki et al. | |
| 4,615,359 A | 10/1986 | Affa et al. | |
| 4,657,049 A * | 4/1987 | Fourty et al. ................. | 138/133 |
| 4,934,412 A | 6/1990 | Fischer et al. | |
| 5,300,336 A | 4/1994 | Wong et al. | |
| 5,549,942 A | 8/1996 | Watts | |
| 5,915,421 A | 6/1999 | Borzym et al. | |
| 5,972,450 A | 10/1999 | Hsich et al. | |
| 6,457,237 B1 * | 10/2002 | Matthews et al. ........ | 29/890.144 |
| 6,589,617 B2 | 7/2003 | Hsich et al. | |
| 7,047,615 B2 | 5/2006 | Norek | |
| 2004/0026015 A1 | 2/2004 | Frantz et al. | |
| 2006/0137431 A1 | 6/2006 | Fernandes et al. | |
| 2006/0180227 A1 | 8/2006 | Hummel et al. | |

FOREIGN PATENT DOCUMENTS

| | | |
|---|---|---|
| JP | 02155933 A | 6/1990 |
| JP | 06159586 | 6/1994 |
| JP | 071198195 | 8/1995 |
| RU | 2182868 | 5/2002 |

* cited by examiner

Primary Examiner — Marc Patterson
(74) Attorney, Agent, or Firm — Greenberg Traurig, LLP

(57) ABSTRACT

A laminated duct structure for gas turbine engines, and a method for manufacturing laminated duct structures for gas turbine engines. The duct structure incorporates a metallic inner layer and a polymeric outer layer. Preferably, the thin metallic layer is a corrosion resistant material such as corrosion resistant stainless steel or titanium. The supporting outer polymeric layer is, in a preferred embodiment of the invention, a polyimide material, such as polyimide resin-impregnated fiberglass cloth.

2 Claims, 3 Drawing Sheets

METAL/POLYMER LAMINATE DUCTING AND METHOD FOR MAKING SAME

BACKGROUND OF THE INVENTION

1. Field of the Invention

The present invention relates in general to ducting structures for turbine engines, and methods for making same.

2. Background Art

Gas turbine engines, especially those for aircraft propulsion applications, utilize ducts for drawing air flow from one portion of the engine, e.g., for providing a source of cooling air, which air flow must then be returned to another portion of the engine.

One such structure which requires ducting is known as the air oil cooler (for cooling the lubricating oil for the engine). This device requires an inlet duct, which guides cooling air, from a forward (inlet) part of the turbine from the fan stream through the air oil cooler. At the downstream side of the cooler heat exchanger structure, an outlet duct guides the "used" cooling air back into the fan stream.

The ducts which service the air oil cooler (and other such engine ducting structures) typically must be able to address several design parameters: 1) the ducts must withstand temperatures ranging from approximately −65° F. to approximately 700° F.; 2) the ducts must withstand relatively low pressure, e.g., approximately 8-18 psig; 3) the ducts must be fireproof and/or fire resistant; 4) the ducts must be resistant to vibration; 5) the ducts must be non-flammable; and 6) the ducts should be as light as possible.

Such intra-engine ducting structures have typically been formed as wholly metallic structures, often fabricated from one or more high-performance materials, such as corrosion-resistant stainless steel (Cres) or titanium.

For example, Peyton et al., U.S. Pat. No. 3,911,961 discloses multilayer ducting for high temperature ducts for aircraft, including an outer insulating sleeve formed from a sandwich of metal foil and resin-impregnated cloth and an inner metal duct, separated by an air gap. Fischer et al., U.S. Pat. No. 4,934,412 discloses a cooling pipe line for a turbine engine, having a load-bearing inner layer of heat-curable, fiber-reinforced resin, surrounded by a heat insulating layer of heat-curable, fiber-reinforced resin.

Norek, U.S. Pat. No. 7,047,615 B2 discloses a method for making turbine engine transition duct bodies without longitudinal welds by hydroforming two duct bodies back to back with bellows thrusters secured to the duct body open ends. This enables the manufacturing of duct bodies with detailed features and high pressure without using compression cylinders. Multi-layer transition duct bodies can also be assembled with layers of different materials, for example, having a heat-resistant layer inside and high strength layer outside. They can be assembled using cold shrinking and heat expanding. In addition, anti-fretting and anti-vibration coatings can be applied between the layers for improved performance.

It would be desirable to provide a ducting structure, e.g., for gas turbine engines, which is lightweight, durable, and resistant to heat, fire and vibration.

These and other desirable characteristics of the invention will become apparent in view of the present specification, including the claims, and drawings.

SUMMARY OF THE INVENTION

The present invention comprises, in part, a laminated duct structure, for conveying air from a first location to a second location, in a gas turbine engine. The duct structure comprises a metallic inner layer; and a polymeric outer layer, bonded to an outer surface of the metallic inner layer. One such polymeric outer layer would be polyimide resin fiberglass cloth.

The metallic inner layer may be fabricated from one of the following materials: corrosion resistant steel; titanium. As mentioned, one preferred polymeric outer layer would comprise fiberglass cloth impregnated with polyimide resin.

The present invention also comprises, in part, a method for making a laminated duct structure, for conveying air from a first location to a second location, in a gas turbine engine.

The method for making a laminated duct structure comprises the steps of:
forming metallic inner layer first and second portions, each having an inner surface and an outer surface;
forming frangible first and second support members, for placement within the metallic inner layer first and second portions;
positioning the first and second support members within the metallic inner layer first and second portions to structurally support the inner surface of each of the metallic inner first and second portions, respectively;
aligning the metallic inner layer first and second portions together;
permanently joining the metallic inner layer first and second portions together;
forming a polymeric outer layer on the outer surfaces of the metallic inner layer first and second portions;
curing the polymeric outer layer; and
removing the frangible first and second support members.

One preferred polymeric layer would comprise polyimide resin impregnated fiberglass cloth.

The step of forming metallic inner layer first and second members may further comprise the step of forming the metallic inner layer first and second members from one of the following materials: corrosion resistant steel, titanium.

The step of forming frangible first and second support members may further comprise the step of forming the frangible first and second support members from a plaster material.

The step of permanently joining the metallic inner layer first and second members may comprise the step of welding the metallic inner layer first and second members together.

The step of forming a polymeric outer layer on outer surfaces of the metallic inner layer first and second portions may further comprise the step of forming the polymeric outer layer from polyimide, preferably polyimide resin impregnated fiberglass cloth.

The step of curing the polymeric outer layer may comprise the step of placing the assembled inner and outer layers in an oven, and heating same until the polymeric outer layer has been cured.

DETAILED DESCRIPTION OF THE INVENTION

Figure 1:
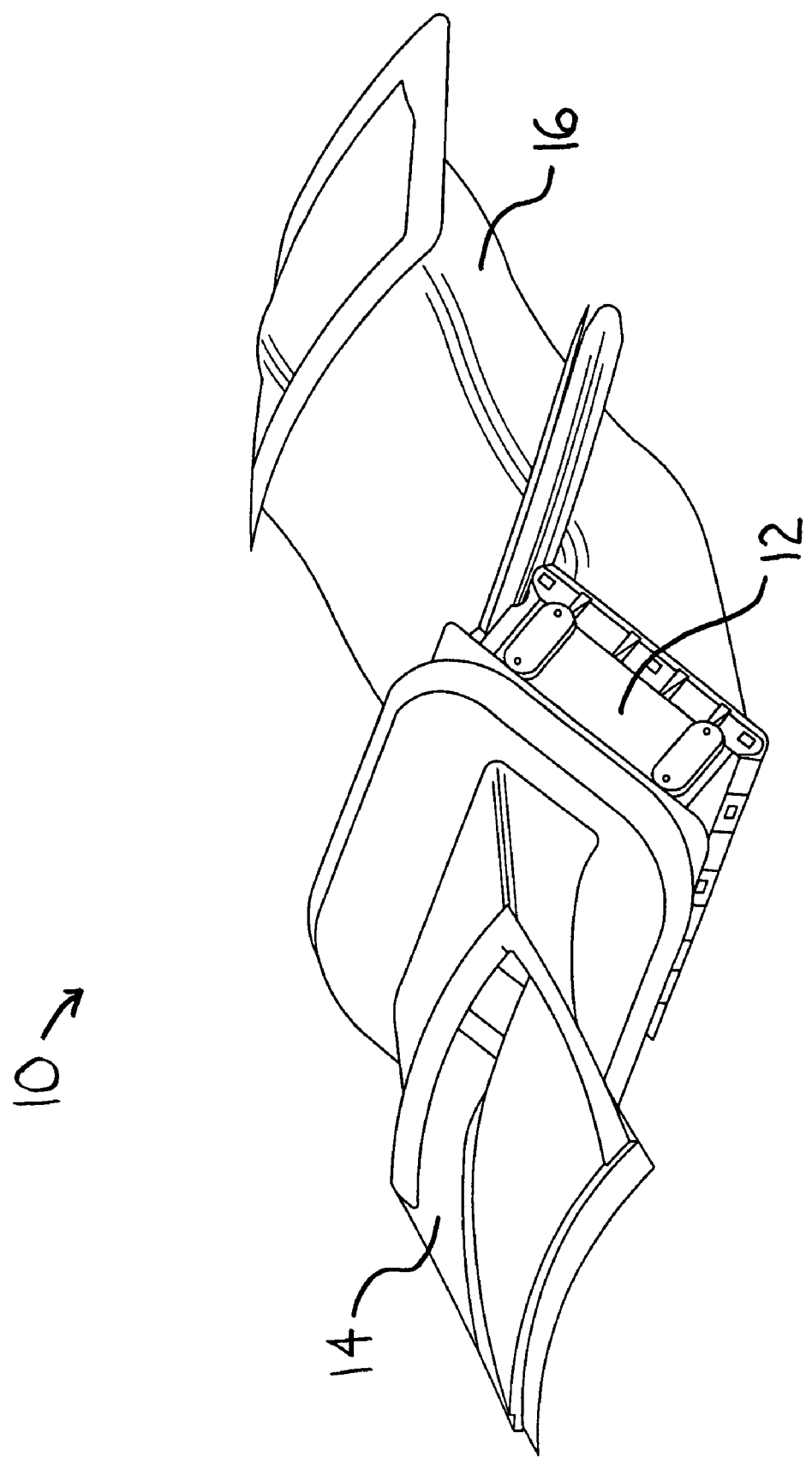
FIG. 1 is a perspective view of an air oil cooler for a gas turbine engine, showing possible inlet and outlet duct structures.

While this invention is susceptible of embodiment in many different forms, there is shown in the drawings, and described in detail herein, a specific embodiment, with the understanding that the present disclosure is to be considered an exemplification of the principles of the invention and is not intended to limit the invention to the embodiment illustrated.

The present invention, in part, comprises a new laminated ducting structure, suitable for use in gas turbine engines, such as aircraft turbine engines. A further aspect of the present invention comprises a method for making the laminated ducting structure.

An air oil cooler 10, for a gas turbine engine, is shown in FIG. 1. Cooler 10 includes heat exchanger 12, together with inlet duct 14 and outlet duct 16, which lead respectively from and to the air stream in the engine, ahead of the combustion region(s) of the engine. The configurations of the heat exchanger 12, and inlet and outlet ducts 14 and 16, respectively, are shown merely by way of example, and, being functions of the architecture of the engine as a whole, will vary from engine to engine. Thus, the specific shape and configuration of inlet duct 14, and outlet duct 16 do not form part of the presently contemplated invention, except as described and claimed herein.

Figure 2:
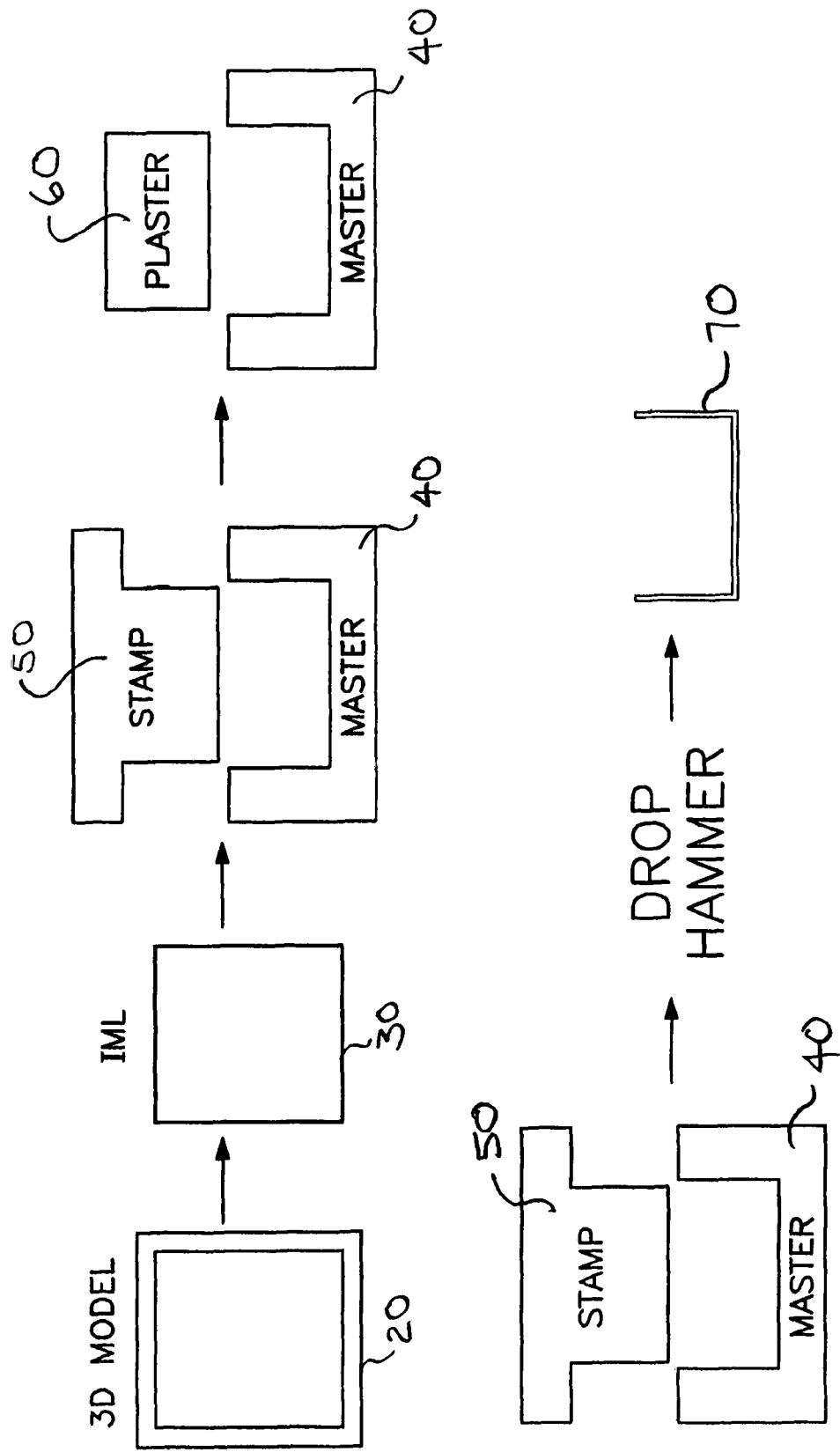
FIG. 2 is a schematic flowchart illustrating the steps in the process of forming the metallic "halves" or "skins" of the ducting, according to a preferred embodiment of the invention.
Figure 3:
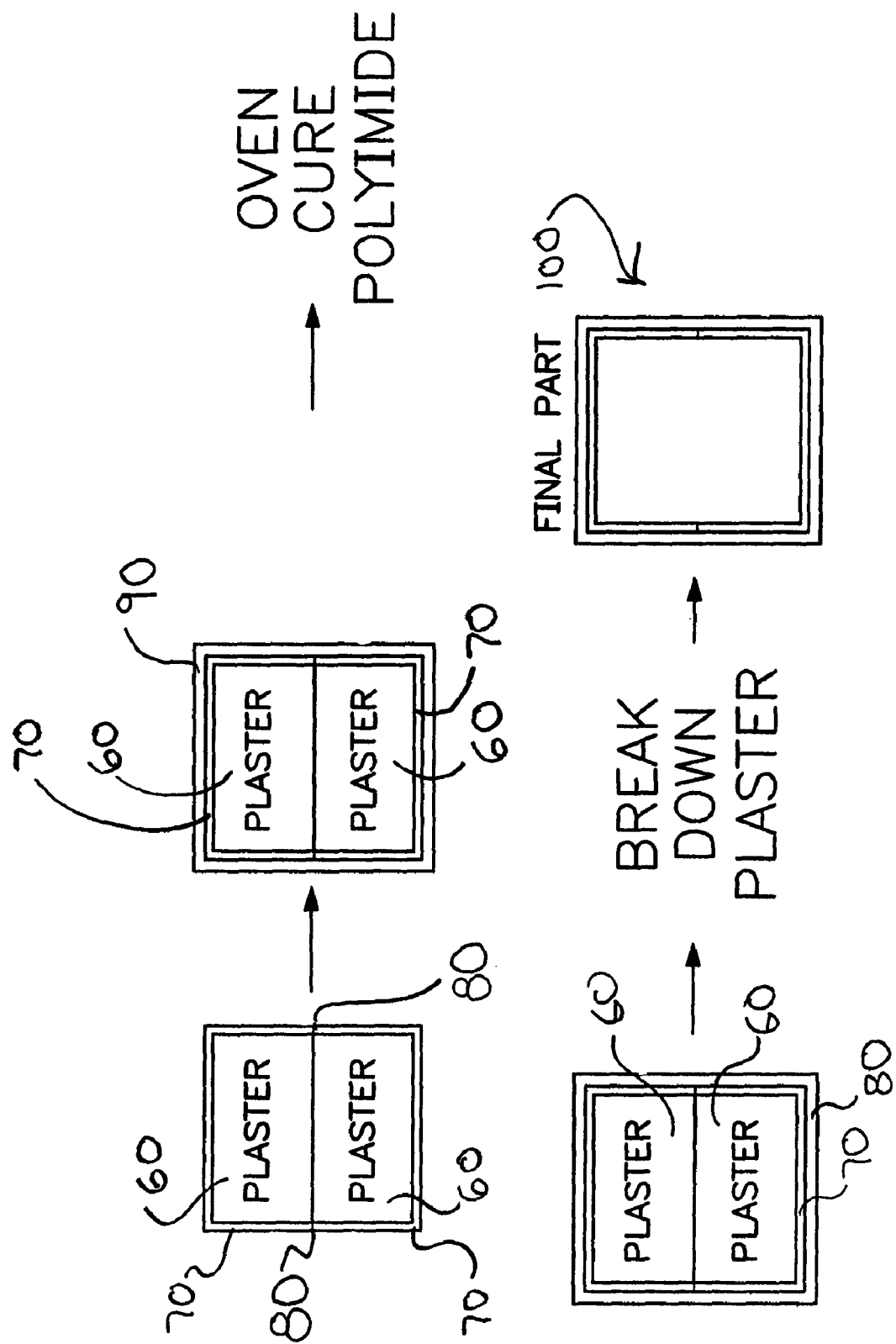
FIG. 3 is a schematic flowchart illustrating the process of assembling metallic "halves" or "skins" of ducting, according to a preferred embodiment of the invention, and subsequently forming the external polymer layer thereon.

Referring to FIG. 2, in accordance with a preferred embodiment of the invention, a duct is formed by first creating a computerized three-dimensional ("3D") image 20 of the duct, using known computer-aided design ("CAD") techniques. The 3D image is used to, in turn, determine the inner mold line or inner surface contour ("IML") and outer mold line or outer surface contour ("OML") (collectively, reference numeral 30) of the upper and lower portions (alternatively known as "skins", or "halves", although not literally so) of the duct, which is then used to create master stamping molds (e.g., mold 40) for each of the upper and lower portions of the duct. Although in the schematic illustrations of FIGS. 2 and 3, the metallic inner layer portions of the ducting are shown as being highly regular and symmetrical, in practice, the metal duct components will likely be highly asymmetrical (as is generally reflected in FIG. 1). Typically, for each metallic portion of the duct structure, usually only two parts will be required to be formed separately and then joined together.

As mentioned herein, the metallic inner layer of the duct is preferably quite thin, e.g., preferably on the order of 0.006" thick, so the clearance between the outer surface of the stamp 50 and the inner surface of the molds will be of a similar dimension, though this dimension is representative, and the invention is not to be construed as being limited thereto.

The molds 40 are used not only to stamp out the actual metal portions of the duct, but also as molds for support blocks 60, the use of which will be described in further detail hereinafter. Preferably, support blocks 60 are fabricated from any suitable frangible material, such as plaster.

As mentioned above, the metal portion of the duct will be very thin (e.g., preferably on the order of 0.006" thickness), and preferably formed from corrosion resistant steel (Cres) or titanium (Ti), although other metals having similar performance characteristics suitable for the application may also be used. After the two metal portions (or "skins"), e.g., skins 70, have been individually stamped, they are joined together with two oppositely positioned, generally longitudinal-extending welds 80 (e.g., "pencil" welds), after the two corresponding support blocks 60 have been placed within the respective metal skins.

Support blocks 60 serve to provide support and rigidity to the metal ducting, during the process steps described hereinbelow. A layer 90 of polymeric material, preferably polyimide resin impregnated fiberglass cloth in either a single ply or multiple plies, in which each ply is approximately 0.010 inches thick) is applied to the outside of the metal duct and heat cured, in an appropriate atmosphere, at a sufficient temperature and for sufficient time, appropriate to the material, to ensure that the polyimide is securely bonded to the outer surfaces of the metal skins.

Preferably, the polyimide resin fiberglass cloth, in its uncured state, is cut in a desirable pattern to fit over the metallic inner layer. Multiple layers or plies of this cloth may be used for added strength or added pressure-carrying capabilities. As part of the curing process, the entire metallic/polyimide assembly is wrapped with shrink tape, shrink wrap or is vacuum-bagged to force the metallic/polyimide layers together and bond them to one another.

Once the curing process has been completed, the plaster support blocks 60 are broken out of the final part 100, and the interior of the metal layer is cleaned of debris and mold release material (if any).

The foregoing description and drawings merely explain and illustrate the invention, and the invention is not limited thereto, except as those skilled in the art who have the present disclosure before them will be able to make modifications and variations therein without departing from the scope of the invention.

What is claimed is:

1. A laminated duct structure, for conveying air from a first location to a second location, the duct structure comprising:
    a substantially uninterrupted U-shaped first metallic skin portion devoid of any slits for forming said first metallic skin portion into a curved body, said first metallic skin portion including opposing first and second longitudinal edges extending between the first location and the second location;
    a substantially uninterrupted U-shaped second metallic skin portion devoid of any slits for forming said second metallic skin portion into a curved body, said second metallic skin portion including opposing first and second longitudinal edges extending between the first location and the second location;
    said first and second longitudinal edges of each of said first and second metallic skin portions being respectively juxtaposed to one another and respectively joined to one another;
    said first and second metallic skin portions forming a metallic innermost substantially continuous, self-supporting layer of the duct structure for conveying the flow of the air from the first location to the second location, said metallic innermost layer having an inner surface proximate to which said air flows, as well as having an outer surface; and
    an uninterrupted continuous, sealed polymeric outermost layer extending over said outer surface of said metallic innermost layer, said polymeric outermost layer being bonded to said outer surface of said metallic innermost layer,
    said polymeric outermost layer being formed, at least in part, from at least one layer of polyimide resin impregnated fiberglass cloth.

2. The laminated duct structure according to claim 1, wherein said metallic innermost layer is fabricated from one of the following materials: corrosion resistant steel; titanium.

\* \* \* \* \*